Patented Nov. 4, 1952

2,616,933

UNITED STATES PATENT OFFICE 2,616,933

HYDRATION OF OLEFINS

Carl B. Linn, Riverside, Ill., assignor to Universal Oil Products Company, Chicago, Ill., a corporation of Delaware No Drawing. Application July 26, 1949,
Serial No. 106,975

7 Claims. (Cl. 260—641)

This invention relates to a process for effecting the catalytic hydration of olefinic hydrocarbons at conditions of temperature and pressure suitable to produce oxygen-containing organic components comprising essentially alcohols and ethers.

An object of this invention is a process for reacting olefinic hydrocarbons and particularly gaseous hydrocarbons with water in the presence of a hydrogen fluoride catalyst to produce the corresponding alcohols.

Another object of this invention is a method of hydrating monoolefinic hydrocarbons in the presence of a hydrofluoric acid catalyst.

One specific embodiment of this invention relates to a process for producing an alcohol which comprises reacting an olefinic hydrocarbon and an aqueous solution of hydrogen fluoride at a hydration temperature, and recovering the resultant alcohol.

Another embodiment of this invention relates to a process for producing an alcohol which comprises reacting a monoolefinic hydrocarbon and an aqueous solution of hydrogen fluoride at a temperature of from about —30° to about 100° C., and recovering the resultant alcohol.

A further embodiment of this invention relates to a process for producing butanol-2 which comprises reacting a normal butene and an aqueous solution containing from about 60 to about 90 per cent by weight of hydrogen fluoride and from about 40 to 10 per cent by weight of water at a temperature of from 0° to 50° C. and at a pressure of from substantially atmospheric to about 100 atmospheres and recovering the resultant butanol.

The present invention comprises an improved process for hydrating olefins and particularly for hydrating normally gaseous monoolefins including ethylene, propylene and the butylenes. It is preferable to have in the reaction system a molar excess of water relative to the olefins in order to obtain a high yield of alcohol with a relatively small amount of polymerization.

Normally gaseous and normally liquid olefins may be hydrated in the presence of a hydrogen fluoride catalyst in equipment designed for either batch or continuous types of operation. Batch type operation may be carried out by contacting an olefin or an olefin-containing hydrocarbon fraction with a molar excess of water or steam in the presence of hydrofluoric acid. In general, the olefinic hydrocarbon is simply contacted with hydrofluoric acid containing from about 60 per cent to about 90 per cent of hydrogen fluoride and from about 40 to 10 per cent by weight of water. In batch type operation the reaction mixture obtained by contacting an olefinic hydrocarbon with an aqueous solution of hydrogen fluoride is subjected to suitable recovery treatment to separate the resultant alcohol from unconverted olefinic hydrocarbon and certain amounts of polymers and hydrofluorinated hydrocarbons.

Also the hydration reaction may be carried out continuously by passing a mixture of the olefin and an aqueous solution of hydrofluoric acid through a suitable reactor such as a tower provided with baffles or a reactor fitted with suitable agitating means. The organic reaction products are then separated from the catalyst, the catalyst is recycled to further use in the hydration of additional quantities of the olefin, and the organic products are subjected to suitable separation treatment to remove the resultant alcohol from polymers and fluoro-alkanes which are by-products of the process.

The process may be carried out in either batch or continuous types of operation at a temperature of from about —30° to about 100° C. and preferably at a temperature of from about 0° to 50° C. The operating pressure may vary from substantially atmospheric to about 100 atmospheres. While the chief hydration product comprises alcohols, it also sometimes contains ethers.

The following example is given to illustrate the results obtained by the process although these data are not introduced with the intention of limiting unduly the general broad scope of the invention.

During a period of one hour, 84 grams of 1-butene was added to 139 grams of hydrofluoric acid containing 77% by weight of hydrogen fluoride and 23% by weight of water using as contactor a steel autoclave at 40° C. provided with an efficient stirrer. Pressures were autogenous. The resultant reaction product was then separated from the hydrofluoric acid and investigated. The organic products recovered were as follows:

| | Grams |
|---|---|
| 2-fluorobutane | 44 |
| Butanol-2 | 24 |
| Polymer | 33 |

I claim as my invention:

1. A process for producing an alcohol which comprises reacting an olefinic hydrocarbon with water in the presence of a catalytic amount of hydrogen fluoride at a hydration temperature, and recovering the resultant alcohol.

2. A process for producing an alcohol which comprises reacting a monoolefinic hydrocarbon with water in the presence of a catalytic amount of hydrogen fluoride at a temperature of from about −30° to about 100° C., and recovering the resultant alcohol.

3. A process for producing an alcohol which comprises reacting a monoolefinic hydrocarbon and an aqueous solution containing from about 60 to about 90 per cent by weight of hydrogen fluoride and from about 40 to about 10 per cent by weight by water at a temperature of from about −30° to about 100° C., and recovering the resultant alcohol.

4. A process for producing an alcohol which comprises reacting a monoolefinic hydrocarbon and an aqueous solution containing from about 60 to about 90 per cent by weight of hydrogen fluoride and from about 40 to about 10 per cent by weight of water at a temperature of from about 0° to about 50° C., and recovering the resultant alcohol.

5. A process for producing an alcohol which comprises reacting a monoolefinic hydrocarbon and an aqueous solution containing from about 60 to about 90 per cent by weight of hydrogen fluoride and from about 40 to about 10 per cent by weight of water at a temperature of from about 0° to about 50° C. and at a pressure of from substantially atmospheric to about 100 atmospheres, and recovering the resultant alcohol.

6. A process for producing butanol-2 which comprises reacting a normal butene and an aqueous solution containing from about 60 to about 90 per cent by weight of hydrogen fluoride and from about 40 to about 10 per cent by weight of water at a temperature of from 0° to about 50° C. and at a pressure of from substantially atmospheric to about 100 atmospheres recovering the resultant butanol-2.

7. A process for producing butanol-2 which comprises reacting 1-butene and an aqueous solution containing from about 60 to about 90 per cent by weight of hydrogen fluoride and from about 40 to about 10 per cent by weight of water at a temperature of from 0° to about 50° C., and at a pressure of from substantially atmospheric to about 100 atmospheres, and recovering the resultant butanol-2.

CARL B. LINN.

REFERENCES CITED

The following references are of record in the file of this patent:

UNITED STATES PATENTS

| Number | Name | Date |
|--------|------|------|
| 2,484,702 | Frey | Oct. 11, 1949 |